July 28, 1964  W. H. ROSS  3,142,246
PRINTER AND ADVANCING MEANS
Filed Oct. 17, 1962  2 Sheets-Sheet 1

INVENTOR.
William H. Ross
BY
John R. Manning
ATTORNEY

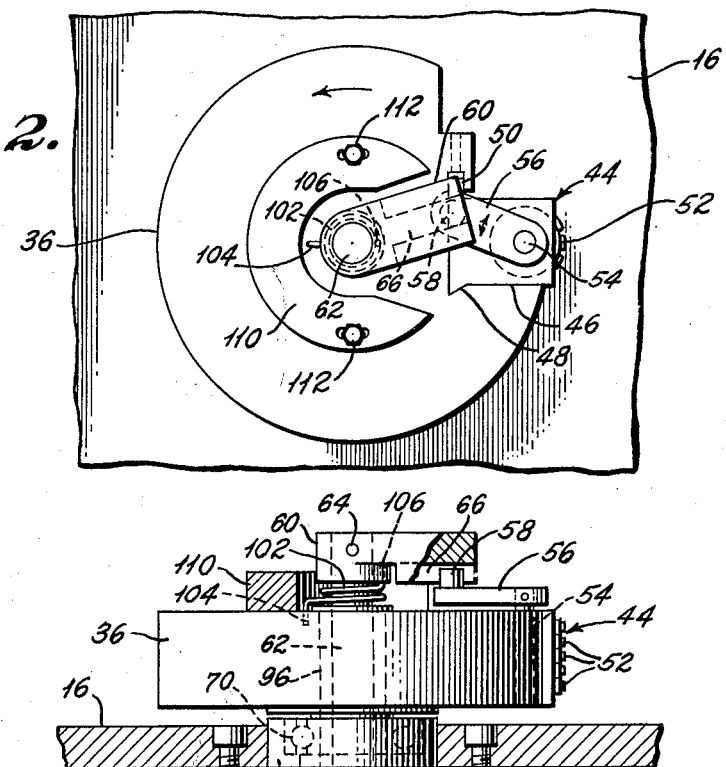

United States Patent Office 3,142,246
Patented July 28, 1964

3,142,246
PRINTER AND ADVANCING MEANS
William H. Ross, Dallas, Tex., assignor to Sperry Rand Corporation, New York, N.Y., a corporation of Delaware
Filed Oct. 17, 1962, Ser. No. 231,151
11 Claims. (Cl. 101—76)

This invention relates to a high speed printer numbering device and advancing means and more specifically to a batch numbering device for a high speed check sorter and means for rapidly advancing the batch numbering device.

Present day commercial operations require the processing of great numbers of documents. One such business operation which has received the full impact of processing large numbers of documents is the banking industry. Bank checks and drafts are presently used for the payment of goods, services, etc., to the exclusion of practically any other method of payment. Accordingly, as our economy moves upwardly, increasing numbers of bank checks or documents are drawn on the depositor institution.

In the past, the typical banking institution has had to maintain a large staff of clerical assistants for the processing of the checks, drafts, deposit slips, etc. These large staffs of clerical people are expensive to maintain, they process documents at a realtively slow rate, and are inefficient in that a great number of errors are committed. Accordingly, it was necessary that some mechanical and/or electronic means be devised to quickly and accurately process the bank documents at a minimum charge or cost to the banking institution.

As modern business has increased in size and complexity, automatic means must be utilized for handling the business documents. In addition, institutions or industries involving sales, transportation, as well as banks and the like, are faced with the problem of sorting and accounting on a day-to-day basis for documents such as the checks, deposit slips, tickets, sales slips, etc. in such quantity that manual handling of these business documents becomes almost a hopeless undertaking. Although several systems have been devised in working toward a solution to this problem, it appears at present that the use of human language symbols printed in magnetic ink on the documents themselves, in conjunction with equipment capable of recognizing these symbols automatically, is perhaps the most practical means for minimizing the manual handling of the documents. If the magnetic ink symbols are to be read and the system operated at a high rate of speed, means must be provided to automatically and sequentially advance the documents past an imprinting station for endorsing or otherwise printing upon the document. It is in this light that the present invention has been made, eliminating many limitations inherent in previous document sorting operations.

The device for automatically sorting documents such as bank checks, is the high speed check sorter presently known in the art. As the documents advance past a magnetic read station, the magnetic numbers formed upon the face of the check are interpreted and the document is advanced to a pocket according to the magnetic code placed thereon. In addition to the sorting operation, it is necessary that the document be endorsed upon its back to indicate the locations in our banking system that have handled the document. In addition, it is necessary that the run or batch number be placed upon the back of the check along with the endorsement to indicate the run or batch in which the check was sorted. A print wheel containing a small numbering device is positioned along the document way and rotating at a peripheral speed equal to the linear speed of the document. As the document passes in front of the imprinting station, synchronism is maintained so that the numbering device is positioned adjacent the area on the document upon which it is desired to print the batch number. In addition, means are utilized to force the document against the numbering device and thereby result in the batch number being imprinted upon the document. At the end of the run or batch, it is necessary that the numbering device be advanced so that the run number imprinted thereon will indicate that the subsequent checks were sorted during a later run or batch operation.

Batch number advancing means known in the prior art are inefficient in that the advancement of the numbering device is accomplished only by stopping the machine and thus resulting in a great deal of lost time which could otherwise be more advantageously utilized. The run or batch number advancing means of the present invention may be accomplished without stopping the sorting operation or varying the routine of operation in any manner. If it is desired that each consecutive check receive successive numbers, the invention may be operated in a manner wherein each successive document, as it passes through the check sorting device, will receive a number greater by one than the number imprinted upon the previous document.

In order that the operation of the machine be as efficient as possible, it must be operated at all times and stopped only in the case of emergencies or, when no documents remain to be sorted. Accordingly, it is desirable that the batch numbering means, and the date stamp, if such is desired, be advanced while the machine continues in operation. In the machine of the present invention, the documents are caused to pass in front of the imprinting station is synchronism with the imprinting wheels. The ink or other printing fluid to be utilized in printing is sprayed upon a transferor roller from a spray means such as a spray gun. The ink is then transferred from the transferor roller to a transferee roller for application to the batch numbering device. Means are provided to actuate a back-up roller if the particular document being driven through the document path is to be numbered. In addition to means for causing the documents to be numbered, the imprinter wheel may house a metal or plastic endorsement stamp and include means for placing the endorsement upon the back of the document and in addition, imprinting the date. In normal operations, the batch number and the date would be imprinted within the endorsement and within areas of the endorsement left vacant for this purpose. When it is desired to advance the batch numbering device, a switch on an operator's console may be actuated to cause the advancement of the batch numbering device.

The advancement of the batch numbering device is accomplished in the following manner. A first shaft is suitably journaled in bearings and driven at the desired speed. The shaft extends upwardly alongside the document path and drives a wheel which houses the batch numbering device. The batch numbering device has an extending arm which when actuated will cause advancement of the numbering device. Means are provided within the numbering device to "carry over" into the next higher order. That is to say, when a lower order numbering wheel of the batch numbering device reaches the digit "9" and is advanced to the digit "0," a "1" will be carried over into the next higher order or wheel of the batch numbering device. A second shaft, concentric to the first shaft, is resiliently coupled to the first shaft and is driven thereby. The upper end of the concentric shaft supports a second arm which engages the arm from the batch numbering device. As the first shaft is driven, at a speed wherein the peripheral velocity of the wheel supporting the batch numbering device is equal to the linear speed of the documents, the concentric shaft will likewise be driven at a number of revolutions equal to the revolutions of the first shaft. If the concentric shaft is reduced in speed or momentarily stopped, the arm coupled to the concentric shaft will rotate the arm extending from the batch numbering device and thus cause an advancement of the batch numbering device. This last means is accomplished by the use of a magnetic solenoid and brake, which brake is connected to rotate with the concentric shaft.

If it is desired to consecutively number each check, then photoelectric means may be employed to sense the presence of a document and in addition to actuating the back-up roller, may be utilized to advance the batch numbering means and thereby result in a consecutive numbering of each document as it passes through or along the document way.

Accordingly, it is the principal object of this invention to improve high speed printers.

It is another object of this invention to improve high speed printers capable of performing batch numbering operations.

It is a further object of this invention to provide a document printing device capable of imprinting the batch number upon the document.

It is a still further object of the present invention to provide batch number advancing means for the numbering device.

It is a still further object of the present invention to provide a printer and batch number advancing means which may be operated at the high speed obtained in a document sorter.

It is a further object of the present invention to provide a batch number advancing device which is simple in operation, is reliable and achieves the desired result with no loss in document sorting time.

Further features and objects of the present invention will be found throughout a more detailed description and a better understanding of the invention will be afforded by the following detailed description considered in conjunction with the accompanying drawings in which:

FIGURE 2 is a plan or top view of the wheel bearing the batch numbering device and showing the arm actuating members thereon;

FIGURE 3 is an elevation view, partly in section, showing the advancing means of the invention; and, FIGURE 4 is a sectional view taken along the lines 4—4 of the FIGURE 3.

Figure 1:
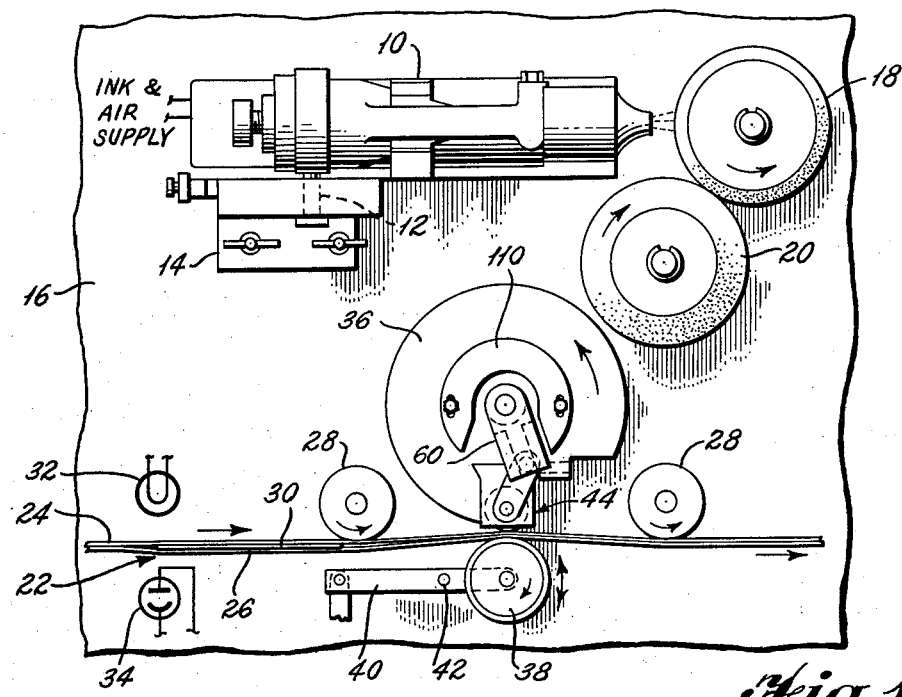
FIGURE 1 is a plan or top view of the imprinting station and showing the means for applying the ink to the numbering device.

As shown in the FIGURE 1, a spraying means 10, which may be a conventional spray gun, has a shaft 12 positioned at right angles, extending therefrom. The shaft 12 of the spray gun 10 passes through a member 14 in such a manner to permit the spray gun 10 to oscillate and permit a distribution of ink from the spraying means 10 upon a roller 18 known as a transferor roller, The member 14 is secured by bolts and wing nuts to a base plate 16, as shown. Printing ink and an air supply are delivered to the spraying means 10, as shown.

The transferor roller 18, which may be of any material suitable for distributing the ink and transferring the printing fluid to a second roller, is positioned from rotation upon the base plate 16 and engages, for transferral of the ink, to a transferee roller 20. The rollers 18 and 20 are journaled within suitable bearings and either roller may be driven which will result in a rotation of the other roller.

In the top view shown in the FIGURE 1, elements are positioned along the base plate 16 to form the document way or path 22. An upper flexible belt 24 and a lower flexible belt 26 are driven to engage a plurality of pulleys, many of which are not shown, to transport the documents through the system. Two such pulleys are shown which engage the upper belt 24. These pulleys 28 are positioned for rotation, on the base plate 16, by engagement with the upper belt 24. It will be understood that a plurality of similar pulleys 28 are positioned upon the base plate 16 to drive and form the document path for the lower belt 26. A document 30 is shown between the belts 24 and 26, just as its trailing edge passes a document presence detector comprising a light source 32 and a photoelectric pick-up cell 34. The light source 32 may be connected to a suitable voltage source and the photoelectric pick-up 34 may be connected to circuits which provide signals as the leading edge and trailing edge of a document 30 pass along the check way formed by the belts 24 and 26.

Positioned for rotational movement upon the base plate 16, is a roller housing 36. The roller housing 36 supports the batch numbering device and the batch number advancing means, to be described in detail with reference to the FIGURES 2 and 3. The roller housing 36 is positioned along the document path, between the rollers 28, so that the batch numbering device will engage the ink transferee roller 20 during a portion of its travel, to cause a deposition of ink on the batch numbering device.

As shown in the FIGURE 1, a back-up roller 38 permits selective numbering or endorsing of the documents. The back-up roller 38 is connected to an arm 40 which pivots about the point 42. When the roller 38 is in its lower position, the documents would not be numbered or endorsed, When the roller 38 is in its upper position, as a result of the left end of the arm 40 being forced downwardly, the documents 30 will be forced against the endorsing or batch numbering device, thus causing an impression thereon. The arm 40 may be oscillated by any suitable means (not shown) for example, a solenoid. Actuation of the solenoid may be commenced by circuits connected to the output of the photoelectric pick-up 34 which will sense the presence of a document by displaying a reduced output from the photoelectric pick-up tube 34. The output from the tube 34 may be directed to inverter circuits, flip-flops, delay lines, etc., which are well known in the art, to provide a signal to actuate the back-up roller 38.

The FIGURE 2 is a top view of the printer and print advancing means while the FIGURE 3 shows an elevational view of this device. The main supporting frame is the base plate 16. The wheel or roller housing 36 supports a batch numbering device 44. The batch numbering device 44 comprises a frame 46, which frame 46 has an extending portion 48 adapted to fit within a triangular groove of the roller housing 36. As noted, a portion of the roller housing 36 is removed to permit the batch numbering device 44 to fit therein. In addition, an added section of the roller housing 36 is removed to permit a set screw 50 to engage the batch numbering device 44 which secures the numbering device 44 within the roller housing 36.

The batch numbering device 44 includes a plurality of number wheels 52 which are supported in line by a shaft 54 which is supported by the frame 46 of the batch numbering device 44. Secured to the shaft 54 is a finger 56 which has the projection 58 secured thereon. If the finger 56 is rotated in a counter-clockwise direction, as viewed in the FIGURE 2, then the batch numbering device 54 will be advanced by one. As stated hereinbefore, the batch numbering device 44 is capable of carrying into higher orders by advancing the next order wheel 52 when the lower order wheel 52 advances from "9" to "0."

Figure 4:
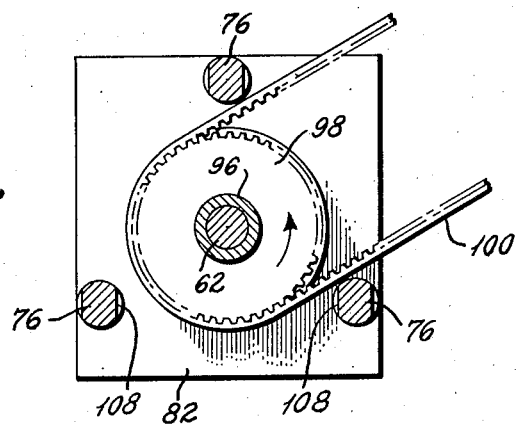

An actuating arm 60 is secured to a shaft 62 by the pin 64. As shown in the sectional view of FIGURE 4, the shaft 62 is the inner shaft of the concentric shafts.

As shown in the FIGURES 2 and 3, the actuating arm 60 has a groove 66 which engages the projection 58 on the finger 56. If the actuating arm 60 is rotated in a clockwise direction as viewed in the FIGURE 2, the projection 58 will slide along the walls of the groove 66 of the actuating arm 60, causing the finger 56 to be rotated in a counterclockwise direction which results in an advancement of the number wheel 52 of the batch numbering device 54.

In the FIGURE 3, the base plate 16 has a circular portion removed to receive a housing 68. The housing 68 has a larger diameter central portion, a smaller upper portion which fits through the base plate 16 and supports a bearing 70, and a smaller lower portion which supports a second bearing 72. The housing 68 is hollow as indicated at 74. The lower portion of the housing 68 is shown in section to more adequately depict how the concentric shafts are supported by the bearings 70 and 72.

A plurality of cylindrical spacers 76 are tapped to receive upper bolts or screws 78 and 80. Holes are also tapped in the base plate 16 to permit the upper bolts 78 and 80 to pass therethrough and to engage the threaded portions formed in the spacers 76. The spacers 76 may engage the lower portion of the central part of the housing 68 and force the larger part of the central portion of the housing 68 against the bottom of the base plate 16 and thereby form a rigid support against the base plate 16. A plate 82 is positioned at the lower ends of the spacers 76 to support the spacers 76 in vertical alignment with the base plate 16. The plate 82 has a number of holes drilled near its periphery, the number of holes being equal to the number of spacers used (three in the embodiment of the invention which was constructed and successfully operated), and the lower ends of the spacers 76 are tapped to allow the plate 82 to be secured against the spacers 76 by the lower bolts 84 and 86.

Additional holes are drilled in the plate 82 to permit the bolts 88 to secure a solenoid 90 thereto. The center of the solenoid 90 is removed to permit the shaft 62 to pass therethrough. Connected by a pin or set screw 92 to the lowermost end of the shaft 62 is a brake plate 94. The upper side of the brake plate 94 is positioned to engage the lower surface of the solenoid 90 when an advance pulse is applied to the solenoid 90. When the solenoid 90 is actuated by the advance pulse or signal as shown, a magnetic force will cause the brake plate 94 to be forced upwardly along with the shaft 62, and engage the lower portion of the solenoid 90, which tends to stop or reduce the rotational movement of the shaft 62.

An outer shaft 96 is supported by the bearings 70 and 72 and is connected to rotate the roller housing 36. The lower end of the shaft 96 is connected to a toothed pulley 98, which pulley 98 is adapted to engage the flexible belt 100 and produce rotational movement thereof. The concentric shafts 62 and 96, the pulley 98, the belt 100 and the spacers 76 are conveniently shown in the sectional view of the FIGURE 4, taken along the lines 4—4 of the FIGURE 3.

The inner shaft 62 is resiliently driven by the outer shaft 96 through a coil spring 102. The coil spring 102 has a portion 104 bent downwardly to engage the roller housing 36 and at the other end of the coil spring 102, there is a portion 106 bent upwardly to engage the actuating arm 60 which is coupled to the shaft 62 by the pin 64.

The spacers 76 have a reduced portion 108 which will receive a wrench for mounting the spacers 76 in the position shown.

As shown in the FIGURE 2 in top view, a horseshoe-shaped stop 110 is secured by the screws 112 to the top of the wheel or roller housing 36. The purpose of the stop 110 is to limit the rotation of the actuating arm 60 to the portion of the stop 110 that is removed to form the horseshoe shape. The holes drilled in the stop 110 for receiving the screws 112 are extended to permit some adjustment of the stop 110 on the roller housing 36.

*Operation*

Before the operation is commenced, the rollers 18, 20 and 36 are brought up to speed and the belts 24 and 36 are started so that the peripheral speed of the roller housing is equal to the linear speed of the belt of the document transport means. Ink and an air supply are provided to the spray gun 10 which in turn sprays ink from its nozzle to the transferor roller 18. The ink is transferred to the transferee roller 20 for subsequent transfer to the number wheels 52 of the batch numbering device 54.

We will assume that the batch numbering device 44 has been cleared (all the number wheels are at zero) and that the batch numbering technique is ready for operation. We will assume that the first run or batch is to be numbered as batch No. 1. Accordingly, the operator would supply an advance pulse to the solenoid 90 of the FIGURE 3, by any suitable means, not shown. Prior to the receipt of the advance pulse by the solenoid 90, the shafts 62 and 96 would be rotating at the same r.p.m. When the signal is applied to the solenoid 90, the brake plate 94 will be forced upwardly to engage the lower surface (a surface on the case of the solenoid 90 which provides a frictional engagement between the non-rotating solenoid case and the rotating brake plate) of the solenoid 90 and cause a momentary stopping or retardation of the shaft 62. This lost motion is taken up by the coil spring 102 which resiliently couples the two shafts together. As the rotational speed of the shaft 62 is retarded, the actuating arm 60 will be caused to rotate in a clockwise direction as viewed in the FIGURE 2, and pull the finger 56 with it. The projection 58 connected to the finger 56 slides in the groove 66 of the actuating arm 60. This downward movement of the finger 56 causes the units number wheel 52 of the batch numbering device 54 to be advanced to the digit "1."

Documents now appear between the belts 24 and 26 (the width of the belts 24 and 26 is much less than the width of the documents) and the document's presence is detected by light source 32 and the photoelectric pick-up tube 34. A signal is sent by any convenient means (not shown) to actuate the back-up roller 38 at the appropriate time to force the document 30 against the number wheels 52 of the batch numbering device 44 to cause an impression of the batch number thereon. If it is desired to number each check consecutively, such as the first check having the number "1" imprinted thereon, the second check having the number "2" imprinted thereon, or in any other order, then the output from the photoelectric pick-up tube 34 may be utilized to provide an advance pulse or signal to the solenoid 90 to provide for the advancement of the batch numbering device 44 after each document has a number imprinted thereon.

After the first batch is run, we will assume that the next batch is to be printed with the number "2." Accordingly, the operator would supply an advance pulse by any suitable means to the solenoid 90 which would again draw the brake plate 94 up to engagement with the lower surface of the solenoid 90. The retardation of momentarily stopping of the shaft 62 would cause rotation of the finger 56 by engagement with the actuating arms 60 and an advancement of the number wheels 52 of the batch numbering device 54. The coil spring 102 will take up the lost motion of the shaft 62 and after the batch numbering device has been advanced, the spring 102 coupled between the driving roller housing 36 and the driven actuating arm 60, will again cause the two shafts 62 and 96 to be rotated at the same r.p.m.

This operation continues and the batch number is placed on every document that passes between the batch numbering device 44 and the back-up roller 38. As indicated hereinbefore, if it is desired to consecutively number the documents by an increasing amount, the batch numbering device 44 is easily advanced in less than half a revolution of the roller housing 36 so that increasing numbers may be applied or printed upon the documents as they are advanced along the document way.

It will be understood that an endorsement plate may be placed upon the roller housing 36 which will cause an impression of the endorsement of the bank as well as the batch number to be placed upon the documents. In addition, a date wheel may be provided along the roller housing 36 and suitably mounted in a manner similar to the batch numbering device 44 or, a second roller housing 36 may be provided for the date stamp.

Thus, there has been described in detail a printer and advancing means capable of placing the batch number, or any other desired impression, on documents as they are passed in front an imprinting station along a document path. The batch numbering device is mounted for rotation upon a roller housing which engages an ink supply during a portion of its rotation. Means are provided to sense when the document is arriving at the imprinting station and additional means are employed to cause a back-up roller to permit the check or document to engage the batch numbering device. Concentric shafts are driven so that the peripheral velocity of the roller housing supporting the batch numbering device is equal to the linear speed of the documents. An outside shaft is driven and connected to the roller housing which is resiliently coupled to drive the inside shaft, which is connected to the advancing means for the batch numbering device. A solenoid is employed, which when actuated, will cause a brake plate to engage the lower surface of the solenoid case or frame and cause the rotation of the inner shaft to be momentarily stopped or retarded. This reduction in speed of the shaft, causes an actuating arm connected to an advancing finger to advance the batch numbering device and thereby cause the desired batch number to be positioned at the printing surface of the batch numbering device and to be placed upon the documents as desired. In addition, the ink supply is provided by a spray gun which is capable of delivering ink through rollers to the batch numbering device accordingly as the high speed operation of the document sorter continues.

When it is desired to advance the batch numbering device, a signal is supplied to the solenoid which through linkage causes the batch numbering device to be advanced once for each advance pulse or signal that is supplied. No stopping of the machine or "downtime" is necessary in the printer and advancing means which was constructed and operated in accordance with the principles of this invention. The batch numbering device could be advanced in approximately ten milliseconds. Thus, if it is desired, the batch numbering device can be advanced by several digits for each revolution of the supporting roller housing.

The invention may be embodied in other specific forms without departing from the spirit and essential characteristics of the invention. The present embodiment is therefore to be considered in all respects as illustrative and the scope of the invention being indicated by the appended claims rather than the foregoing description, and all changes which come within the meaning and range of equivalency of the claims are therefore intended to be embraced therein.

What is claimed is:

1. Printing means comprising an advanceable print head having a finger coupled thereto for advancing said print head, means to support said print head, a first shaft connected to said means to support for rotating said print head, a second shaft resiliently coupled to said first shaft and driven thereby, means connecting an end of said second shaft to said finger of said print head, and means coupled to the other end of said second shaft for momentarily retarding the speed of said resiliently coupled second shaft to cause relative movement between said shafts to thereby permit said means an advancement of the impression caused by said print head.

2. The combination as defined in claim 1 wherein said first and said second shafts are concentric.

3. Printing means comprising an advanceable numbering means, a support for said numbering means, a first shaft for rotating said support, a concentric second shaft resiliently driven by said first shaft, a finger connected to said numbering means for advancing said numbering means, an arm affixed to an end of said second shaft and engaging said advancing finger, and means connected to the other end of said second shaft for momentarily retarding the speed of said resiliently driven second shaft to cause relative movement between said shafts to thereby permit said arm to actuate said finger of said numbering means to result in an advancement of the impression caused by said numbering means.

4. Printing means comprising an advanceable numbering means, a support for said numbering means, a first shaft for rotating said support, a concentric second shaft resiliently driven by said first shaft, a finger connected to said numbering means for advancing said numbering means, an arm affixed to said second shaft and engaging said advancing finger, and an electromagnetic brake connected to the other end of said second shaft for momentarily retarding the speed of said resiliently driven second shaft to cause relative movement between said shafts to thereby permit said arm to actuate said finger of said numbering means to result in advancement of the impression caused by said numbering means.

5. Printing means comprising an advanceable numbering means, a support for said numbering means, a first shaft for rotating said support, a concentric second shaft resiliently driven by said first shaft, a finger connected to said numbering means for advancing said numbering means, an arm affixed to an end of said second shaft and engaging said advancing finger, means connected to the other end of said second shaft for momentarily retarding the rotational speed of said resiliently driven second shaft, means forming a document path adjacent said printing means, means for sensing the presence of a document in said means forming the document path, and means coupling said means to sense for the presence of a document to said means connected to the other end of second shaft for momentarily retarding the speed of said resiliently driven second shaft to cause relative movement between said shafts to thereby permit said arm to actuate said finger of said numbering means to result in an advancement of the impression caused by said numbering means.

6. Printing means comprising an advanceable numbering means, a support for said numbering means, a first shaft for rotating said support, a concentric second shaft resiliently driven by said first shaft, a finger connected to said numbering means for advancing said numbering means, an arm affixed to an end of said second shaft and engaging said advancing finger, means connected to the other end of said second shaft for momentarily retarding the rotational speed of said resiliently driven second shaft, means forming a document path adjacent said printing means, means for sensing the presence of a document in said means forming the document path, and additional means coupled to said means for sensing the presence of a document to permit selective printing of the documents in said document path.

7. The combination as defined in claim 5 wherein said means connected to the other end of second shaft is an electromagnetic brake.

8. Printing means comprising a numbering means having an advancing finger connected thereto, a support for said numbering means, a first shaft for rotating said support, a concentric second shaft, resilient means connected between said first and said second shafts, means coupled to said first shaft for providing rotational motion of said first shaft and through said resilient means of said second shaft, an arm affixed to an end of said second shaft, said arm including a channel for engaging said advancing finger of said numbering means, and means connected to the other end of said second shaft for momentarily retarding the speed of said resiliently driven second shaft to cause relative movement between said shafts to thereby permit said arm to actuate said finger of said numbering means to result in an advancement of the impression caused by said numbering means.

9. Printing means comprising a numbering means having a support for said numbering means, a first shaft for rotating said support, a concentric second shaft, resilient means connected between said first and said second shafts, means coupled to said first shaft for providing rotational motion of said first shaft and through said resilient means to said second shaft, an arm affixed to an end of said second shaft, said arm including a channel for engaging said advancing finger of said numbering means, a base member for supporting said shafts, an electromagnet positioned upon said base member and surrounding the other end of said second shaft, and a brake plate secured to the other end of said second shaft and capable of being drawn into engagement with the case of said electromagnet which results in a momentary retarding of the speed of said resiliently driven second shaft to thereby cause relative movement between said shafts which permits said arm to actuate said finger of said numbering means to result in an advancement of the impression caused by said numbering means.

10. The combination as defined in claim 9 including means to selectively actuate said brake plate by the application of an advancing pulse to said electromagnet.

11. The combination as defined in claim 9 including means forming a document path adjacent said printing means, means to sense for the presence of a document in said means forming the document path, a back-up roller positioned along said document path and juxtaposed said printing means, and means coupling the means to sense for the presence of a document to said back-up roller to result in the transfer of an impression to a document from said numbering means.

References Cited in the file of this patent

UNITED STATES PATENTS

| | | |
|---|---|---|
| 2,013,687 | Jones | Sept. 10, 1935 |
| 2,347,619 | Taylor | Apr. 25, 1944 |
| 2,516,721 | Persson | July 25, 1950 |
| 2,655,100 | Persson | Oct. 13, 1953 |
| 2,655,103 | Hirschey | Oct. 13, 1953 |
| 2,667,831 | Streich | Feb. 2, 1954 |
| 2,923,233 | Persson | Feb. 2, 1960 |
| 3,037,447 | Gonzalez, et al. | June 5, 1962 |
| 3,046,877 | Janke | July 31, 1962 |

UNITED STATES PATENT OFFICE
CERTIFICATE OF CORRECTION

Patent No. 3,142,246                            July 28, 1964

William H. Ross

It is hereby certified that error appears in the above numbered patent requiring correction and that the said Letters Patent should read as corrected below.

Column 7, line 74, after "means" insert -- connecting an end of said second shaft to said finger of said print head, to actuate said finger to result in --.

Signed and sealed this 1st day of December 1964.

(SEAL)
Attest:

ERNEST W. SWIDER                              EDWARD J. BRENNER
Attesting Officer                                  Commissioner of Patents